Patented June 18, 1940

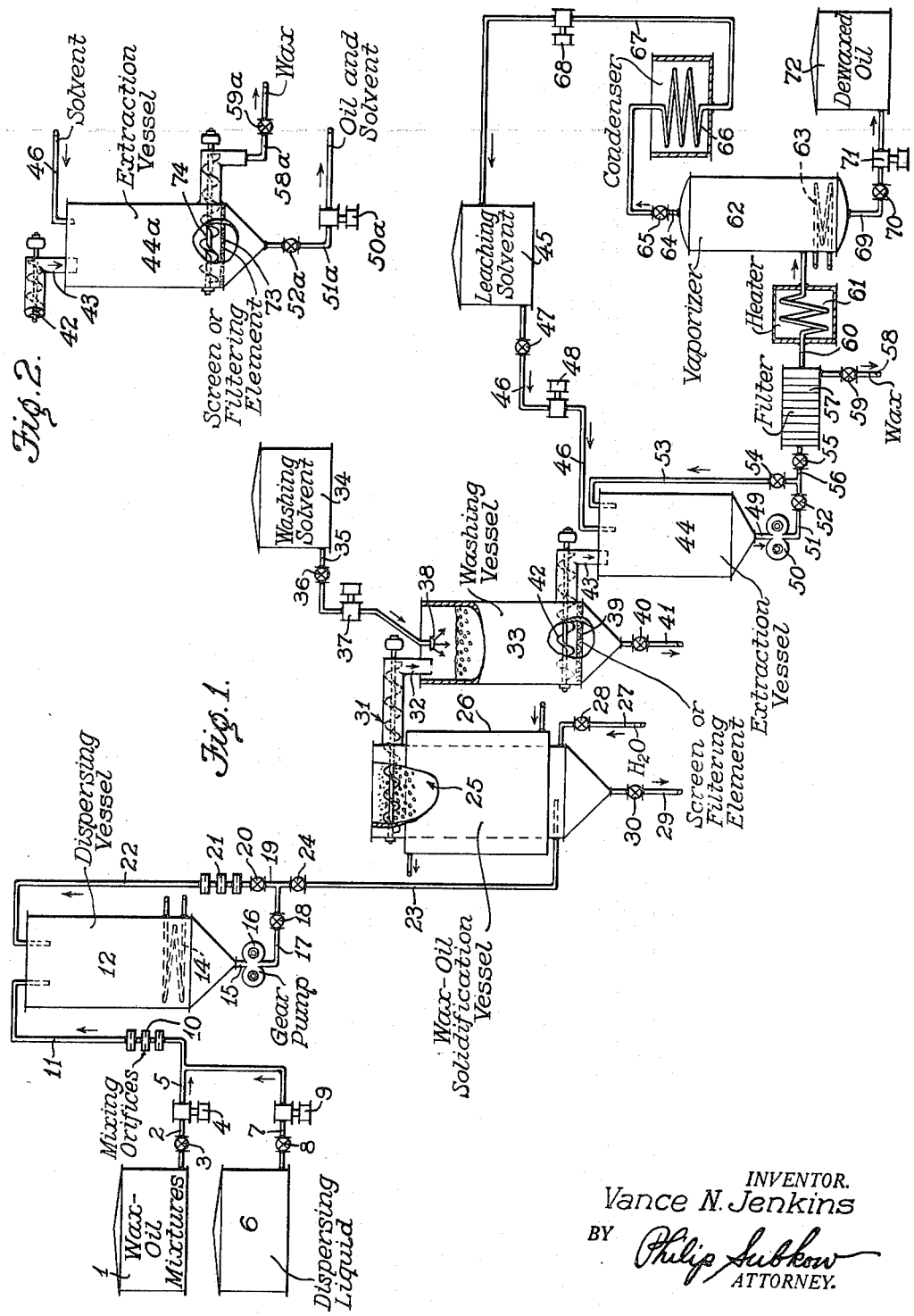

2,205,096

UNITED STATES PATENT OFFICE 2,205,096

PROCESS FOR SEPARATING WAX FROM WAX-OIL MIXTURES

Vance N. Jenkins, Palos Verdes Estates, Calif., assignor to Union Oil Company of California, Los Angeles, Calif., a corporation of California Application March 19, 1937, Serial No. 131,807

1 Claim. (Cl. 196—18)

The present invention relates to the separation of oil and wax from wax-oil mixtures such as waxy oils or oily waxes and more particularly pertains to a method wherein the oil in the wax-oil mixture is extracted while the wax-oil mixture is in the shape of small balls with a solvent adapted to remove the oil contained in said balls. The method may be employed either to separate wax from oils containing the same or to deoil waxes such as for example slack waxes which may previously have been separated from oils. However, I have found the process forming the subject matter of my invention to be particularly useful in deoiling waxes to produce high melting point waxes, particularly in deoiling slack waxes which have been separated from oils which have been refined with a solvent, as for example, with liquid sulfur dioxide, to remove non-paraffinic oil fractions from the oils.

In the conventional process for separating oil from a wax-oil mixture, the latter is chilled to a temperature sufficiently low to crystallize the wax in the oil and then the precipitated wax is separated from the oil by settling, filtering or centrifuging. In treating some wax-oil mixtures of high viscosity, some operators dilute the wax-oil mixture prior to chilling and wax separation. The solvent is then removed from both the solution and wax.

The waxes so obtained have associated with them a considerable proportion of oil and of low melting point waxes. To eliminate the oil and low melting point waxes, the waxes are customarily subjected to a so-called "sweating" process, in which the oily wax is cooled below its melting point and then the temperature is slowly raised to allow the oil to drain out of the crystalline wax. The facility and success of such operations depend largely upon the crystalline character of the structure and even with the most favorable crystal formation, the separation is slow, tedious and generally inefficient.

I have discovered that greatly improved results may be obtained if the wax-oil mixture is treated with a suitable solvent for oil, while the wax-oil mixture is in the form of small, round non-adherent balls. These wax balls are easily handled and settle very rapidly from the usual solvents. I have found that if the wax-oil mixture is dispersed or suspended in the form of small droplets, at a temperature above the solidification point of the wax-oil mixture in a liquid in which the oil and wax are substantially insoluble that upon rapid and immediate chilling of the suspension to a temperature below the solidification point of the wax-oil mixture, the material will separate from the suspending liquid in the form of small round balls which do not adhere to each other.

I have found water, aqueous solutions of the hydroxides, carbonates and silicates of the sodium and calcium groups of metals, various salt solutions as, for example, calcium or sodium chloride solutions, and the lower alcohols and ketones to be suitable liquids in which to effect the suspension or dispersion of the liquefied wax-oil mixture. In general, any liquid or solution may be used which gives an oil-in-water type dispersion of the wax-oil mixture when it is agitated with them. Either water or alcohol is satisfactory for use with fairly well refined wax-oil mixtures but as a rule, caustic or salt solutions are better for use with products containing soaps, asphalt or resins.

The suspension or dispersion may be effected by simple agitation of the two liquids, i. e., the wax-oil mixture and the suspending liquid. Shaking, mechanical stirring and circulation through a gear pump and orifices all have been successfully used as a means of agitation. The temperature of agitation, the violence of the agitation, and the nature of the suspending liquid all influence the size of the suspended droplets obtained.

The proportion of dispersing or suspending liquid employed to disperse the wax-oil mixture depends upon its characteristics and also upon the characteristics of the wax-oil mixture. In general, a sufficient amount of the dispersing liquid is employed to produce a readily pumpable mixture at the temperature of admixture. I have found, however, that the best results are obtained when the volume of the suspending liquid is at least equal to that of the wax-oil mixture being dispersed in it.

The rapid chilling of the warm suspension may be accomplished in various ways. Mixing it with water, alcohol, acetone, etc., at a temperature below the solidification point of the wax-oil mixture has proven to be a satisfactory procedure. Another very satisfactory procedure is to mix the wax-oil mixture with chilled solvents such as light naphtha, butane or propane. In general, the lower the solidification point of the wax-oil mixture, the lower must be the temperature to which the suspension is rapidly cooled in order to prevent adherence of the balls of the wax-oil mixture formed.

The rapid and sudden chilling of the dispersion results in the solidification of the wax-oil droplets into a plurality of tiny balls of wax-oil mixture which may be as small as 0.5 mm. in diameter but which may be as large as 2 mm. in diameter. These balls of solid wax separate quickly from the liquid employed to chill the dispersion, either rising to the top of the container or settling to the bottom of it, depending upon the relationship of the specific gravity of the wax-oil mixture and the cooling liquid. Then the balls may be skimmed off or otherwise withdrawn from the chilling vessel. The sudden and rapid chilling of the dispersion also results in a separation of the dispersing liquid from the solidified balls. This liquid may also be withdrawn from the solidification vessel together with the liquid employed to chill the dispersion. The balls of this diameter generally occupy a volume, when closely packed, equivalent to 2 or 4 times the volume of the melted wax-oil mixture from which they are produced.

As a next step in the process, it may be preferable to wash the separated balls of wax-oil mixture with a suitable liquid to separate any entrained dispersing and/or chilling liquid. This step is particularly important if water or an aqueous solution has been employed as the dispersing and/or chilling liquid and the subsequent step of leaching or extraction of the oil from wax balls is carried out at a temperature below 32° F. with a solvent which is immiscible with water. A wash with a small amount of alcohol or acetone before extraction results in preventing the wax-oil balls from becoming coated with a thin film of ice which would prevent effective contact with the leaching solvent. The washing of the balls is preferably accomplished at a temperature sufficiently below the solidification temperature of the balls to prevent them from melting and cohering with each other.

The extraction of the oil from the solidified balls and the separation of the solution of oil and solvent from the treated wax balls may be accomplished in a number of various ways. One particularly good method is to pass the solidified balls into a vessel of the solvent maintained at a temperature at which the wax is substantially insoluble in the chosen liquid and circulate the mixture through a gear pump back to the vessel for a sufficient period of time to insure the complete extraction of the oil from the balls. Working in this manner, the balls are disintegrated to form a fine granular dispersion which settles and filters with extreme rapidity and ease. The mixture of oil solvent solution and wax may then be allowed to settle in the extraction vessel or in a separate vessel or it may be filtered to remove the oil solvent solution from the extracted wax particles. If desired, the extraction and separation of the oil from the solidified balls may be effected by simply passing the balls into a vessel filled with the leaching solvent at the appropriate leaching temperature and allowing the balls to remain in contact with the solvent for a period of time sufficient to permit the solvent to thoroughly dissolve the oil contained in the balls. The solution of oil and solvent may then be drained from the leached wax structures. In this method, it is preferable to retain the wax structures on a screen or filtering element provided near the bottom of the vessel so that the oil solvent solution may readily strain through the screen without carrying any of the wax structures with it. After the liquid contents have been drained from the container, the wax structures retained on the screen may be given a further wash with fresh solvent to remove occluded oil and solvent.

The leaching or extraction solvent is preferably one which is capable of dissolving oil but inappreciable quantities of wax at the temperature of extraction. Such a solvent may be a lower alcohol such as the propyl, butyl and amyl alcohols, or a lower ketone such as methyl ethyl ketone, methyl propyl ketone, methyl iso-butyl ketone, or an ester or ether of a lower alcohol such as methyl or ethyl acetate or diethyl ether, or diisopropyl ether, or a low boiling liquid hydrocarbon such as benzene, light naphtha, casinghead gasoline or a liquefied normally gaseous hydrocarbon such as propane or butane. If desired, mixtures of the foregoing solvents or other solvents may be employed. For example, I have obtained excellent results using a mixture of benzene and acetone as an extraction solvent.

The temperature at which the extraction is carried out will depend upon the composition of the wax-oil mixture and upon the characteristics desired for the separated products. For example, if it is desired to produce a high melting point wax without regard to the pour test of the extracted oil, the temperature of extraction will correspondingly be higher than when it is desired to produce a low pour test oil and a lower melting point wax. When treating slack waxes which have been separated from oils by dissolving the oil in a solvent, chilling the mixture to precipitate wax and then filtering the chilled mixture to separate the wax, I have found a suitable extraction temperature using methyl ethyl ketone to be in the neighborhood of 75° F. Using other solvents, the temperature will vary with the solvent power of the solvent for the oil and different melting point waxes desired to be separated from the wax-oil mixture.

From the foregoing, it is apparent that an important object of my invention is to provide a method for separating a wax-oil mixture into its constituent parts in a rapid and efficient manner.

A further object of my invention resides in extracting the oil from wax-oil mixtures in the form of solidified small round and non-adherent balls with a suitable solvent for oil at the temperature of extraction.

A further object of my invention is to form the solidified wax-oil balls by dispersing a liquefied wax-oil mixture in a suitable dispersing liquid and then suddenly and rapidly chilling the dispersion. It is an object of the invention to effect the sudden and rapid chilling by contacting the dispersion with a suitable liquid maintained at a temperature below the solidification point of the wax-oil mixture.

A further object of my invention is to wash the solidified wax-oil balls with a suitable liquid to remove entrained dispersing and/or chilling liquid prior to extraction.

Another object of the invention is to treat the washed wax-oil balls with a solvent capable of dissolving oil but not appreciable quantities of wax at the temperature the solvent is employed and thus extracting the oil from the wax-oil balls and then separating the extracted oil and solvent from the wax particles by settling, filtering or centrifuging.

These and other objects and advantages of my invention will become apparent to those skilled in the art from the following description of the invention taken from the drawing which is not to be considered as limiting my invention and in which:

Fig. 1 is a diagrammatic arrangement of apparatus for carrying out one modification of my invention;

Fig. 2 represents another modification of the invention.

Referring to Fig. 1 of the drawing, the wax-oil mixture in tank 1 at a temperature above its congealing point is withdrawn through line 2 controlled by valve 3 and is pumped by pump 4 into line 5 where it meets a stream of the suspending liquid, for example, an aqueous solution containing a small amount of a dispersing agent such as sodium resinate taken from tank 6 via line 7 controlled by valve 8 and pump 9. The mixture then passes through orifice mixers 10 in line 11 into the dispersing vessel 12 which is provided with coil 14 so that the contents in vessel 12 may be maintained at a proper temperature by circulating steam or other heating or cooling medium through the coil.

The suspension of the wax-oil mixture in the dispersing or suspending liquid may be completed by circulating the contents in the tank 12 through line 15, gear pump 16, line 17 controlled by valve 18, line 19 controlled by valve 20, mixing orifices 21 and line 22 back to the dispersing vessel 12. During this circulation, valve 24 in line 23 is closed.

With some wax-oil mixtures and also some dispersing liquids their suspension in a dispersing liquid may be accomplished by simple agitation with a high speed stirrer in which case the circulation of the mixture from and to the dispersing vessel through orifice mixers may be substituted by this simple operation. I have found it to be preferable, however, to circulate the wax-oil mixture and dispersing liquid in the manner stated above and disclosed in the drawing since this method results in the production of a dispersion which will remain stable for a longer period of time due to the fineness of the particles of the wax-oil mixture in the dispersing liquid.

When the suspension of the wax-oil mixture in the dispersing liquid is complete, valve 20 is closed and valve 24 is opened which allows the dispersion to pass into the bottom of the wax-oil solidification vessel 25 which is filled with a suitable liquid, for example, water at a suitable temperature for effecting solidification of the wax-oil mixture by contact therewith. The vessel 25 is preferably surrounded with a jacket 26 through which a cooling medium may be circulated to maintain the liquid in the vessel at a proper temperature below the solidification point of the wax-oil mixture.

The contact of the dispersion with the cooled liquid in the vessel 25 rapidly chills and solidifies the wax-oil mixture in the aqueous phase into a plurality of small round balls of approximately 0.5 to 2 mm. in diameter, depending upon the nature of the dispensing liquid and wax-oil mixture and the degree of agitation employed. The wax-oil balls separate from the aqueous phase and rise quickly to the surface of the cooling liquid and do not adhere to each other. If desired, fresh water at the proper temperature may be introduced into the vessel via line 27 controlled by valve 28 and spent water may be withdrawn via line 29 controlled by valve 30.

The rapid chilling of the warm dispersion may be accomplished in various ways. The admixture with water at a temperature below the solidification point of the wax-oil mixture described above is a satisfactory procedure. However, other liquids such as alcohol, acetone and the like at a proper temperature below the solidification point of the wax-oil mixture may be substituted for part or all of the water. Another satisfactory procedure is to mix the dispersion in case the wax-oil mixture has been dispersed in a liquid other than water or an aqueous solution with chilled light hydrocarbon solvents such as light naphtha or liquefied normally gaseous hydrocarbons such as propane or butane. In general, the lower the solidification point of the wax-oil mixture, the lower must be the temperature to which the dispersion is rapidly cooled in order to prevent adherence of the balls of wax-oil mixture formed by contact with the cold liquid.

The solidified balls of wax and oil rising to the surface of the cooling liquid are withdrawn from the top of the vessel 25 by means of a motor driven screw conveyor 31 or other suitable devices and pass via a spout 32 into a washing vessel 33 where they are washed with a water miscible solvent such as alcohol or acetone at a temperature insufficient to dissolve wax-oil particles in order to prevent the wax-oil particles from becoming coated with a thin film of ice upon contact with the extraction solvent in case it is immiscible with water and is at a temperature below 32° F. which would prevent effective contact with the solvent. The washing solvent is withdrawn from tank 34 via line 35 controlled by valve 36 and is pumped by pump 37 through spray head 38 into the washing vessel. The washing vessel is preferably provided with a very fine screen or filtering element 39 in order to retain the solidified particles during washing. During the washing operation, valve 40 on line 41 is kept open so that the liquid draining through the filtering element may be withdrawn from the washing vessel.

After the solidified wax-oil balls have been thoroughly washed with cold solvent, they are transferred by means of a motor driven screw conveyor 42 and spout 43 into the extraction vessel 44. Leaching solvent is withdrawn from tank 45 via line 46 controlled by valve 47 and is pumped by pump 48 into the extraction vessel.

The mixture of leaching solvent and solidified wax-oil balls is preferably agitated by circulation of the mixture from the bottom of the extraction vessel via line 49, gear pump 50, line 51 controlled by valve 52, line 53 controlled by valve 54 back to the extraction vessel. During circulation, valve 55 on line 56 is closed. After a period of circulation sufficient to insure that all oil is extracted from the solidified balls, valve 54 is closed and valve 55 is opened and the mixture is filtered in any conventional filter 57 to separate the wax from the solution of oil and solvent. Wax is removed from the filter via line 58 controlled by valve 59 and may be passed to an evaporator not shown for recovering the solvent therefrom. It will be recognized that the separation of the leached wax particles from the solution may also be accomplished by settling or by means of a centrifuge.

The filtrate or solution of oil and solvent is passed via line 60 through heater 61 into vaporizer 62 where the solvent is vaporized from the oil aided by steam circulated through closed coil 63. The vaporized solvent passes into line 64 controlled by valve 65, is condensed in condenser 66 and is returned to tank 45 by pump 68 in line 67. The oil is withdrawn from the bottom of the vaporizer via line 69 controlled by valve 70 and is pumped by pump 71 into storage tank 72.

As a modification of my process, instead of effecting a thorough mixture of the wax-oil balls with the leaching solvent followed by a filtration step to remove the wax from the solution of oil and solvent, I may operate in the manner disclosed in Fig. 2. In this method, the washed wax-oil balls from washing vessel 33 are transferred to extraction vessel 44a which is previously filled with the cold leaching solvent and which is provided with a screen or filtering element 73. After allowing the wax-oil balls to remain in contact with the solvent for a period of time sufficient to permit the solvent to thoroughly leach the oil from the solidified structures, valve 52a in line 51a is opened and the solution filtering through the screen 73 is withdrawn from the vessel by means of pump 50a. Preferably, a further quantity of fresh solvent is allowed to wash through the wax cake retained on the screen after the solution has been withdrawn from the vessel prior to the discharge of the wax cake from the vessel by means of the motor driven screw conveyor 74. The wax cake may be passed to further treating apparatus via line 58a controlled by valve 59a. If desired, the washing and/or extraction may be accomplished in vessel 33 since this vessel is similar to 44a.

In the foregoing description, I have described the process using water or an aqueous solution as the suspending liquid and also as the chilling liquid for effecting solidification of the wax-oil mixture. For that reason, a washing step was included. However, in the event that alcohol or acetone is used in place of water and aqueous solution, the washing step need not be employed. When such liquids are used, the process may be carried out by simply dispersing the wax-oil mixture in alcohol or acetone or a similar non-oil dissolving solvent, the dispersion chilled to solidify the wax-oil mixture in a liquid of the same or similar composition as the dispersing liquid and then this mixture may be circulated in the extraction vessel 44 through the gear pump 50 in order to effect a disintegration of the wax balls in the liquid. To this dispersion is then added an oil solvent such as benzene or naphtha in the proper proportion to give with the dispersing and chilling liquids remaining with the wax-oil balls, a mixed solvent which selectively dissolves oil but not wax at the temperature of the extraction. This mixture may then be filtered to separate the crystallized wax from the oil and solvent. Operating in this manner, it will readily be seen that a number of the vessels shown in the drawing may be dispensed with. As a matter of fact, the entire dispersing may be effected in vessel 12 and the chilling and extraction may be accomplished in vessel 44, thus deleting vessels 25 and 33.

The following represent examples of the process forming the subject matter of my invention:

*Example 1*

One liter of melted slack wax having a melting point of 136° F. and 2 liters of denatured alcohol were circulated through a gear pump at a temperature of 145° F. for approximately 5 minutes which resulted in dispersing the wax-oil mixture in the alcohol. The mixture was then slowly drawn into 3 liters of denatured alcohol at a temperature of 75° F. The wax-oil mixture suspended in the warm alcohol was instantly solidified into very small wax balls. A portion of the alcohol was decanted, and the remainder, with the wax balls, was transferred into a container which carried a 100 mesh wire screen as a filter at a point slightly above the bottom solvent draw-off line. This container was surrounded by an ice bath by means of which the alcohol and wax balls were cooled to a temperature of 33° F. The alcohol was then drawn off through the screen, the wax balls remaining on it in a layer about 6½ inches thick. Two liters of solvent consisting of 90% benzene and 10% toluene, previously cooled to 33° F. were then added to the wax and the mixture stirred for 5 minutes. The solvent was then drawn off through the screen. The wax was then treated in the same manner with three separate one liter portions of solvent, followed by two additional dumps of solvent of 500 ml. each. A total of 6,000 ml. of solvent (or .6 volumes on the base of the wax charged) was used. The temperature of each extraction was between 32° and 34° F. The wax balls were not appreciably disintegrated by the solvent, the filtrate through the screen being free from wax particles. The wax balls settled to a very free filtering cake which was still approximately 5 inches thick after the last solvent dump was drained from it. Each solvent dump was allowed to drain until all dripping from the cake had ceased. Considering the over-all time of draining, the average rate at which the solvent drained through the wax cake was calculated to be slightly over 20 gallons per hour per square foot of cake surface. Only 50 minutes time was consumed in completing this experiment after the wax balls were produced and chilled.

The recovered wax was then given a 25-pound per barrel treat with 98% sulfuric acid at 180° F. followed by a treatment with 5% of Filtrol or decolorizing clay at 400° F. The treated wax had a gravity of 38.5° A. P. I. at 60° F., an N. P. A. (melted) color of 1½ and a melting point (Ubbelhode) of 148° F.

*Example 2*

1000 ml. of slack wax having a melting point of approximately 136° F. was melted at a temperature of 180° F. and was then mixed with 1500 ml. of a 3° Bé. caustic soda solution at a temperature of 130° F. by circulating the ingredients together through a gear pump and orifice plate placed in the circulating line leading from the bottom of a steam jacketed container. The temperature of the dispersion was maintained at 140°–150° F. while being circulated from and back to the container. After about 5 minutes of circulation with the pump used, a fine dispersion of the wax in the caustic solution was obtained which was slowly drawn into about 4 gallons of tap water at a temperature of 78° to 80° F., the suspended droplets of wax instantly solidified into small round balls which were less than 0.5 mm. in diameter and occupied a space when closely packed equivalent to 2 to 4 times the volumes of the melted wax from which they were produced. The aqueous phase was then drained from the solidified balls. The wax balls were then washed with 1000 ml. of acetone at a temperature of 75° F. and then passed into 5000 ml. of pentane at 35° F. After allowing the balls to contact the solvent for about 15 minutes, the solvent containing dissolved oil was withdrawn from the wax balls. Then 2000 ml. of fresh pentane was added, allowed to stand with the balls for another 15 minute period and the oil solvent solution was then withdrawn. The thus extracted wax was then freed of solvent by distillation and found to have a melting point of 160° F.

The foregoing description is presented as illustrative of the generic invention and not as limiting inasmuch as many modifications will be obvious to those skilled in the art.

I claim:

A process for separating oil from wax-oil mixtures which comprises dispersing a liquefied wax-oil mixture in an aqueous solution to form an oil in water type dispersion, passing said aqueous wax-oil dispersion into a body of water maintained at a temperature below the solidification point of the wax-oil mixture and thereby solidifying the wax-oil mixture into a plurality of non-adherent particles which readily separate from said aqueous solution, removing the aqueous solution from the solidified wax-oil particles, washing said wax-oil particles with a solvent capable of dissolving water but substantially no oil or wax at the temperature of said washing, commingling said separated wax-oil particles with a solvent capable of dissolving oil but inappreciable amounts of wax at the temperature of admixture and thereby dissolving oil from said wax-oil particles and separating the dissolved oil and solvent from the wax particles.

VANCE N. JENKINS.